(12) United States Patent
Robillard et al.

(10) Patent No.: US 8,628,657 B1
(45) Date of Patent: Jan. 14, 2014

(54) FLOOR SINK STRAINER ASSEMBLY

(75) Inventors: Russell Wayne Robillard, Baton Rouge, LA (US); Fred Wayne Robillard, Baton Rouge, LA (US)

(73) Assignee: Reliable Plumbing, Inc., Baton Rouge, LA (US)

( * ) Notice: Subject to any disclaimer, the term of this patent is extended or adjusted under 35 U.S.C. 154(b) by 345 days.

(21) Appl. No.: 13/221,982

(22) Filed: Aug. 31, 2011

(51) Int. Cl.
*E03F 5/06* (2006.01)
*B01D 35/02* (2006.01)
*E03F 5/04* (2006.01)

(52) U.S. Cl.
CPC .............. *E03F 5/0407* (2013.01); *E03F 5/06* (2013.01); *E03F 2005/063* (2013.01); *E03F 2005/066* (2013.01); *B01D 35/02* (2013.01); *B01D 2201/0438* (2013.01); *B01D 2201/304* (2013.01)
USPC ........... 210/163; 210/164; 210/232; 210/460; 4/288; 4/292; 52/302.1; 285/346

(58) Field of Classification Search
USPC ......... 210/163, 164, 165, 166, 232, 459, 460, 210/474; 4/286, 288, 289, 292; 52/302.1; 285/346
See application file for complete search history.

(56) References Cited

U.S. PATENT DOCUMENTS

| | | | |
|---|---|---|---|
| 983,767 A * | 2/1911 | Reed ................................. 4/288 |
| 2,283,365 A * | 5/1942 | Heinkel ........................ 210/166 |
| 3,896,511 A * | 7/1975 | Cuschera ........................... 4/288 |
| 4,134,162 A | 1/1979 | Sharland | |
| 4,146,939 A | 4/1979 | Izzi | |
| 4,232,407 A | 11/1980 | Williams | |
| 4,879,771 A * | 11/1989 | Piskula .............................. 4/286 |
| 5,469,670 A * | 11/1995 | Thaler ............................ 210/163 |
| 5,695,222 A * | 12/1997 | Hodges ......................... 285/346 |
| 6,092,244 A | 7/2000 | Rizzardi | |
| 6,165,357 A * | 12/2000 | Cormier ......................... 210/163 |
| 6,330,724 B1 | 12/2001 | Belle | |
| 6,647,682 B2 * | 11/2003 | Bishop ......................... 52/302.1 |
| 7,600,644 B2 * | 10/2009 | McCallum ................... 210/163 |
| 8,496,811 B2 * | 7/2013 | Cohen ........................... 210/163 |
| 2008/0295236 A1 | 12/2008 | Eichler | |

* cited by examiner

*Primary Examiner* — Christopher Upton
(74) *Attorney, Agent, or Firm* — Roy Kiesel Ford Doody and Thurmon (57) ABSTRACT

A strainer assembly for use with an indirect waste receptor comprising an internally threaded, expandable gasket member sized to be insertable into the indirect waste receptor discharge tube operatively connected to a building drain system drain pipe; a rigid support structure forming an externally threaded wall to operatively mate with the gasket member in a manner to expand the gasket member body into sealing contact with the discharge tube or drain pipe and having a spoke member extending across a rigid support structure passageway with a vertical opening in its center section; a strainer having a screw opening alignable with the spoke member center section opening; and a screw seatable in the screw opening and having a length to operative attach to the center section opening for affixing the strainer to the rigid support structure.

12 Claims, 5 Drawing Sheets

FLOOR SINK STRAINER ASSEMBLY

BACKGROUND OF THE INVENTION

1. Field of the Invention

This invention relates in general to strainers, and more particularly to strainers that can be utilized with floor drains and indirect waste receptors, such as floor sinks.

2. Prior Art

In most buildings there will be a variety of plumbing fixtures that are supplied with water or which receive or discharge liquids or liquid-borne wastes. To assist in removal of liquid waste from these plumbing fixtures, there may be one or more indirect waste receptors, such as a floor sink, that will indirectly receive their liquid waste through an air gap. Other indirect waste receptors include mop receptors, service sinks, standpipe drains having integral air gaps, and other similar assemblies. The indirect waste receptors will then operatively connect to the building drain system, such as through a drain pipe, which in turn will be operatively connected to an outside building sewer system. In addition, buildings are likely to be constructed having floor drains intended for the purposes of the collection and disposal of waste water used in cleaning the floor, as well as for the collection and disposal of accidental spillage to the floor. Typically, such floor drains are provided with floor level strainers to prevent large solid objects from entering the floor drains. These floor drains are also operatively connected to a drain pipe forming part of the building drain system. Such floor sinks and floor drains have been used for many years in a wide variety of facilities such as commercial kitchens and laundries to collect liquid waste from a plumbing fixture or collect waste water used in the cleaning the floor or spillage which may have accidently spilled on the floor.

In addition to the liquid and small solid waste material, other larger solid materials, such as forks, spoons and other cooking utensils, as well as tin cans and plastic lids may be dropped on the floor. In too many cases these materials will be swept into the floor sinks or, if the floor level strainer has been removed, into the floor drains. Unless prevented many of these materials will enter the drain pipe forming part of the building drain system where they can become stuck and eventually create a blockage in the building drain system and/or even the sewer system when the two systems are operatively connected. Such blockage can prevent the liquid and smaller solid waste materials from passing through the drain pipe to the sewer system. When this occurs it is necessary to attempt to remove from the building drain system the material that has created the blockage. This is not only time consuming, but in many instances not possible without breaking up and tearing out sections of the concrete flooring to permit access to the area of that the drain pipe is blocked.

To prevent the blockage of the building drain system, a variety of strainers have been designed to either fit in the floor sink well or over the floor drain opening to prevent the larger solid objects from entering into the drainage tube or the drain pipe. Three principal problems exist with many of these strainers. First, the strainers must be easily, but securely fixed in a sealing position, yet quickly and easily removable should it become necessary to access the discharge pipe. Second, the strainers can not form an obstacle above the floor surface that might cause persons working around the floor sink or drain to trip and fall. Thirdly, the strainers must be tamper resistant to prevent unauthorized workers from removing the strainers.

To overcome these designs obstacles, various strainer configurations have been proposed. Examples of such prior art configurations are disclosed in U.S. Pat. No. 6,092,244; U.S. Pat. No. 6,330,724; and U.S. patent application Ser. No. 12/050,198 (Publication No. 2008/0295236). However, despite the advancement in the prior art there remains in the industry a need for a strainer for use in a floor sink or floor drain that is easy and quick to install, that forms a sealing arrangement with the drain pipe or the drainage tube, that effectively blocks solid objects from entering the drain pipe or drainage tube to prevent a blockage from forming, that can easily and quickly be removed by authorized personnel should it be necessary to clean the strainer, the sink or drain well, or have access to the drain pipe, and that once cleaned can be again easily and quickly installed.

OBJECTS AND SUMMARY OF THE INVENTION

Therefore, one object of this invention is to provide a strainer that can be operatively used with a floor drain or indirect waste receptor, such as a floor sink, so as not to protrude above the floor surface.

Another object of this invention is to provide a floor drain or indirect waste receptor, such as a floor sink, with a strainer that can be quickly and easily installed to form a sealing arrangement with the floor or sink discharge tube or with the drain pipe of the building drain system.

A still other object of this invention is to provide a floor sink strainer that will effectively block solid objects that enter the floor drain or floor sink well from entering the drain pipe and create a blockage in the building drain system.

A still further object of this invention is to provide a strainer that can be removed easily and quickly by authorized personnel should it be necessary to clean the sink well or the strainer or have access to the discharge pipe, and that can then be easily and quickly re-installed.

It is still another object of this invention to provide a strainer that is not easily and quickly removed without special equipment.

Other objects and advantages of this invention shall become apparent from the ensuing descriptions of the invention.

Accordingly, the strainer assembly of this invention comprises an expandable gasket member having a body sized to fit into a indirect waste receptor or floor drain discharge tube, or into a drain pipe of the building drain system, and having a lip section extending from the upper perimeter section of the body to seat above the top of the discharge tube or the drain pipe. The expandable gasket member further having a threaded passageway extending vertically through the gasket member. The strainer assembly further comprises a relatively rigid support structure whose exterior side walls are threaded to operatively mate with the threaded passageway of the gasket member. The support structure is sufficiently rigid and sized so that when it is operatively threaded to the gasket member it will expand the gasket member to form a seal with the interior surface of the discharge tube or the drain pipe. The rigid support structure also has an axially centered passageway to permit liquid and small particle material to pass into the drain pipe. The rigid support structure further has at least one spoke member extending between the side walls of the axially centered passageway and whose center section is provided with a vertically oriented opening extending through the at least one spoke member. The strainer assembly further comprises a top central oriented section provided with a screw opening extending through the dome-shaped strainer member that can be aligned with the opening in the center section of the spoke member. The strainer assembly also includes an elongated screw having a head section and a threaded section. The head section is sized to permit the head section to seat on the top central oriented section when the screw is inserted into the screw opening. The screw is sized to extend from the screw opening and into the opening in the center section of the spoke member to operative affix the strainer member to the rigid support structure.

In a preferred embodiment the rigid support structure will have more than one spoke member that together serve as a secondary strainer in the event that the strainer member is removed to prevent larger solid objects from entering the discharge pipe.

In another preferred embodiment the screw head will have a tamper resistant construction that permits only specialized tools to be used to disconnect the screw from the rigid support structure. In a more preferred embodiment the screw will be constructed to have a locking mechanism to further prevent an unauthorized person from disconnecting the screw from the rigid support structure so that the strainer member can be removed from the sink well.

When used with a floor sink it is preferred that the strainer will be dome-shaped having a first series of upper vertical slots and a second series of lower notches to facilitate the flow of liquid waste and smaller material through the strainer.

If the strainer is utilized with a floor drain having a sufficiently deep well, it is preferred that two strainers be utilized. One of the strainers would be a floor level strainer and the second strainer would be a dome-shaped strainer that fits within the well. In this embodiment the dome-shaped strainer would have a first series of upper vertical slots and a second series of lower notches to facilitate the flow of liquid waste and smaller material through the dome-shaped strainer. Additionally, the dome-shaped strainer would be constructed to have a top surface screw opening. In an alternate configuration the floor level strainer would also have a top surface screw opening alignable with the dome-shaped strainer screw opening. In these configurations the screw would seat over one of the two openings and extend sufficient distance into the opening in the center section of the spoke member to operative affix the strainer member to the rigid support structure.

The foregoing has outlined rather broadly the features and technical advantages of the present invention in order that the detailed description of the invention that follows may be understood. Additional features and advantages of the invention will be described hereinafter which form the subject of the claims of the invention. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings illustrate a preferred embodiment of this invention utilized with a floor sink. However, it is to be understood that this embodiment is not intended to be exhaustive, nor limiting of the invention. It is but one example of the construction of this invention.

PREFERRED EMBODIMENTS OF THE INVENTION

Without any intent to limit the scope of this invention, reference is made to the figures in describing the preferred embodiments of the invention.

There are various configurations of standard floor sinks and floor drains. Generally, each has in common a collection basin or well and a lower waste discharge tube extending downward from the floor of the collection basin. The discharge tube will be operatively connected to a drain pipe forming part of the building drain system so that liquid waste material entering the collection basin will pass into the drain pipe. In most cases the floor sink will not be positioned in a walking area of the floor but will be position underneath plumbing equipment so that the drain hoses from the plumbing equipment will be positioned over the floor sink. In this position the floor sinks would not a floor level strainer, but could have one if desired. On the other hand, in most instances the floor drain will be positioned in the walking areas of the floor and will therefore have a floor level strainer.

Figure 1A:
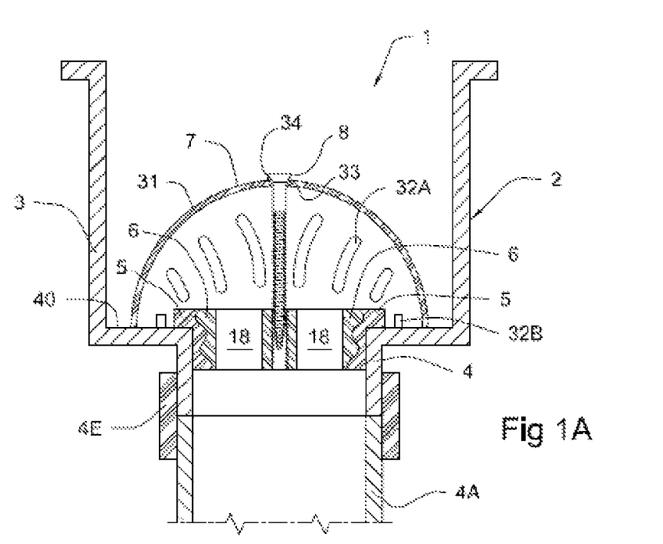
FIG. 1A is a cross-sectional view of the floor sink strainer assembly positioned in a typical floor sink well with the expandable gasket member extending into the floor sink well discharge tube.
Figure 1B:
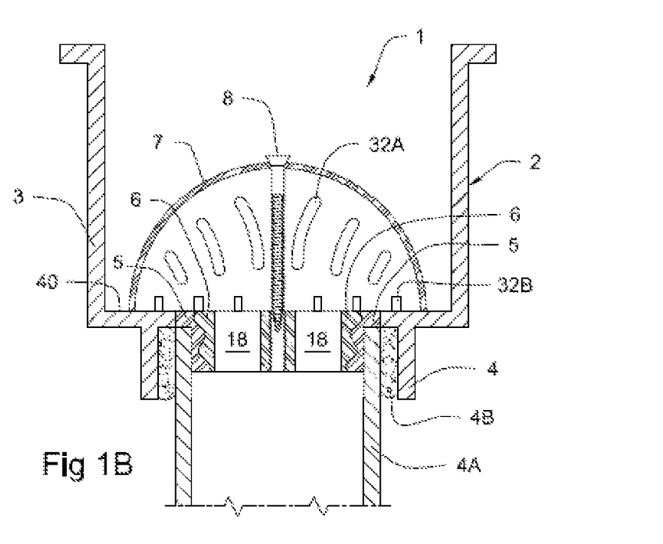
FIG. 1B is a cross-sectional view of the floor sink strainer assembly positioned in an alternate embodiment of a typical floor sink well with the expandable gasket member extending into the drain pipe of the building drain system.
Figure 1C:
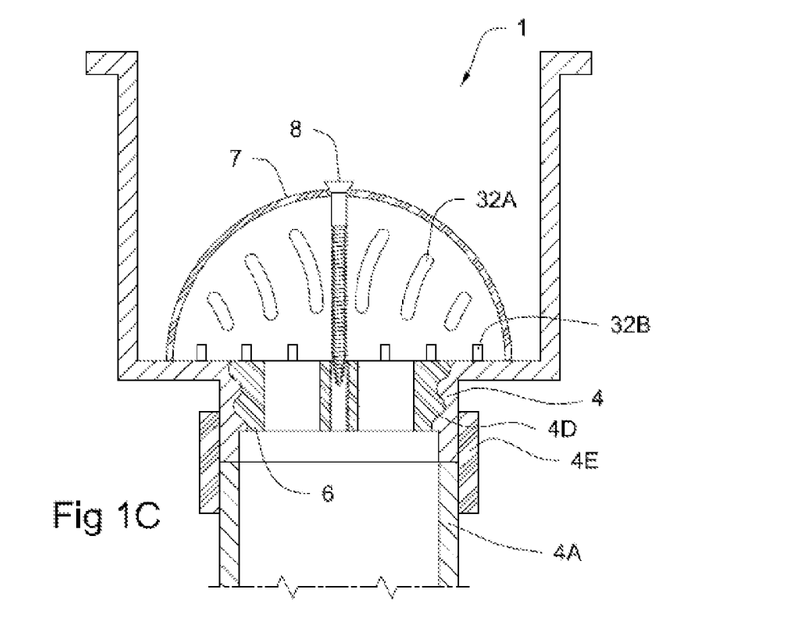
FIG. 1C is a cross-sectional view of an alternate embodiment of the floor sink strainer assembly for use with a floor sink discharge tube having interior threads to permit the support member to be directly screwed to the discharge tubing.
Figure 1D:
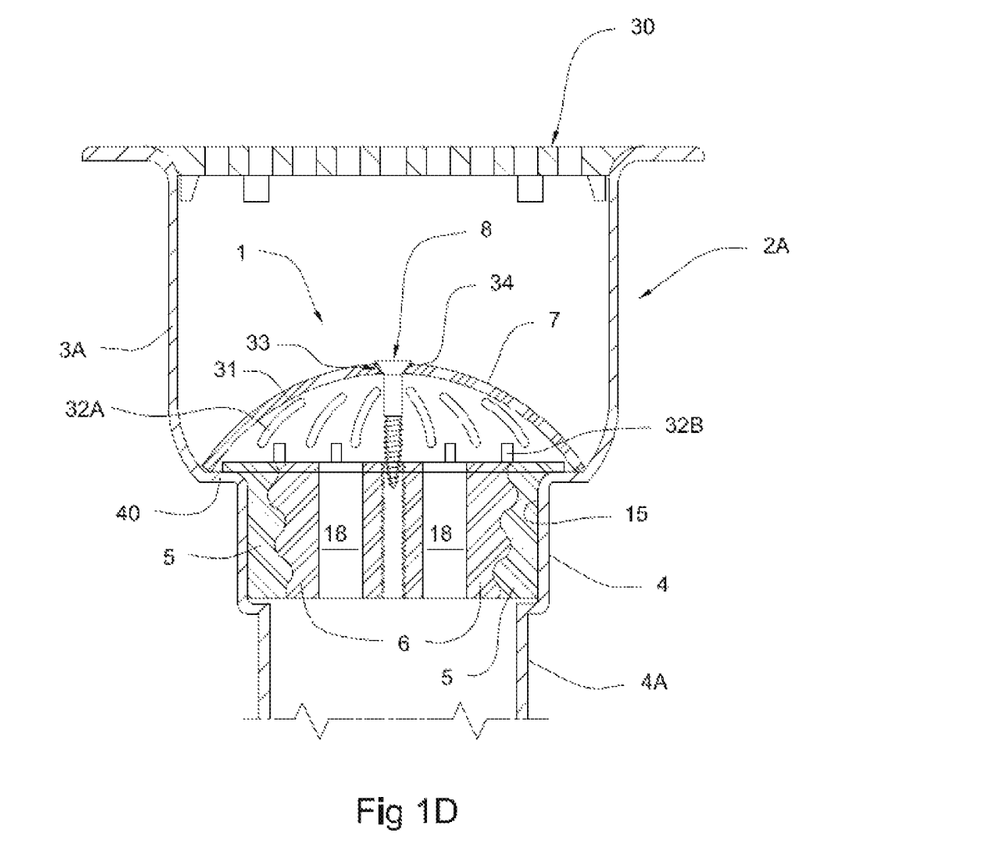
FIG. 1D is a cross-sectional view of an alternate embodiment of a floor drain strainer assembly having a floor level strainer in addition to the dome-shaped strainer.
Figure 1E:
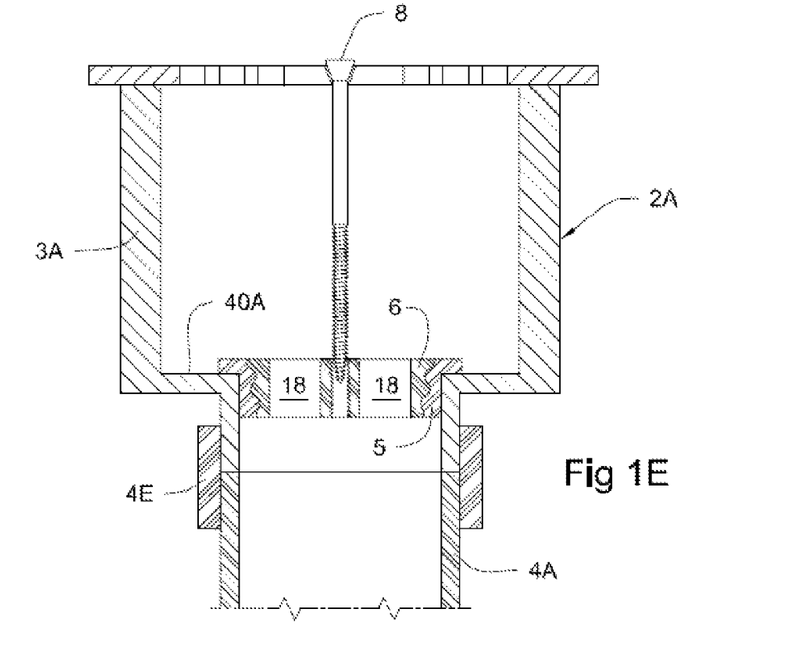
FIG. 1E is a cross-sectional view of an alternate embodiment of a floor drain strainer wherein the tamper resistant screw affixes the floor level strainer to the support structure.

FIGS. 1A and 1B illustrate preferred constructions of the floor sink strainer assembly 1 that can be used to retrofit conventional style floor sinks 2. In FIG. 1A the strainer assembly 1 includes expandable gasket member 5 extends into and can form a seal with floor sink drainage tube 4. In FIG. 1B the expandable gasket member 5 extends into and can form a seal with drain pipe 4A. The description below discussing the features of the FIG. 1A embodiment are equally appropriate for the FIG. 1B embodiment except that expandable gasket member 5 extends into and can form a seal with drain pipe 4A when support structure 6 is screwed into expandable gasket member 5. In this embodiment a plumbing sealing material 4B is utilized to attach drain pipe 4A to drainage tube 4. FIG. 1C illustrates an alternate construction of a specially designed floor sink 2 wherein the floor sink drainage tube 4 is provided with interior threading 4D that would permit the support member 6 to be directly attached to drainage tube 4. In this alternate construction the need for an expandable gasket member would be eliminated. FIGS. 1D and 1E illustrate embodiments of a floor drain 2A. In FIG. 1D a floor level strainer 30 extends over the top of well 3A and a dome-shaped strainer 7 is positioned within well 3A and affixed by a tamper resistant screw 8 to a support structure 6 that is screwed into gasket 5 in the same manner as described with respect to the floor sinks 2. In FIG. 1E there is no dome-shaped strainer 7 and tamper resistant screw 8 affixes the floor level strainer to the support structure 6.

Referring to FIG. 1A the floor sink strainer assembly 1 is constructed to fit within floor sink well 3. In this configuration drainage tube 4 is operatively affixed by conventional means, such as coupling 4E, to the drain pipe 4A of the building drain system. Strainer assembly 1 comprises in a preferred embodiment an expandable gasket member 5, a support structure 6, a dome-shaped strainer member 7, and an elongated tamper resistant screw 8 attachable to one another and within floor sink 2 as illustrated in FIG. 1A.

Figures 2, 3, 4, 5, 7:
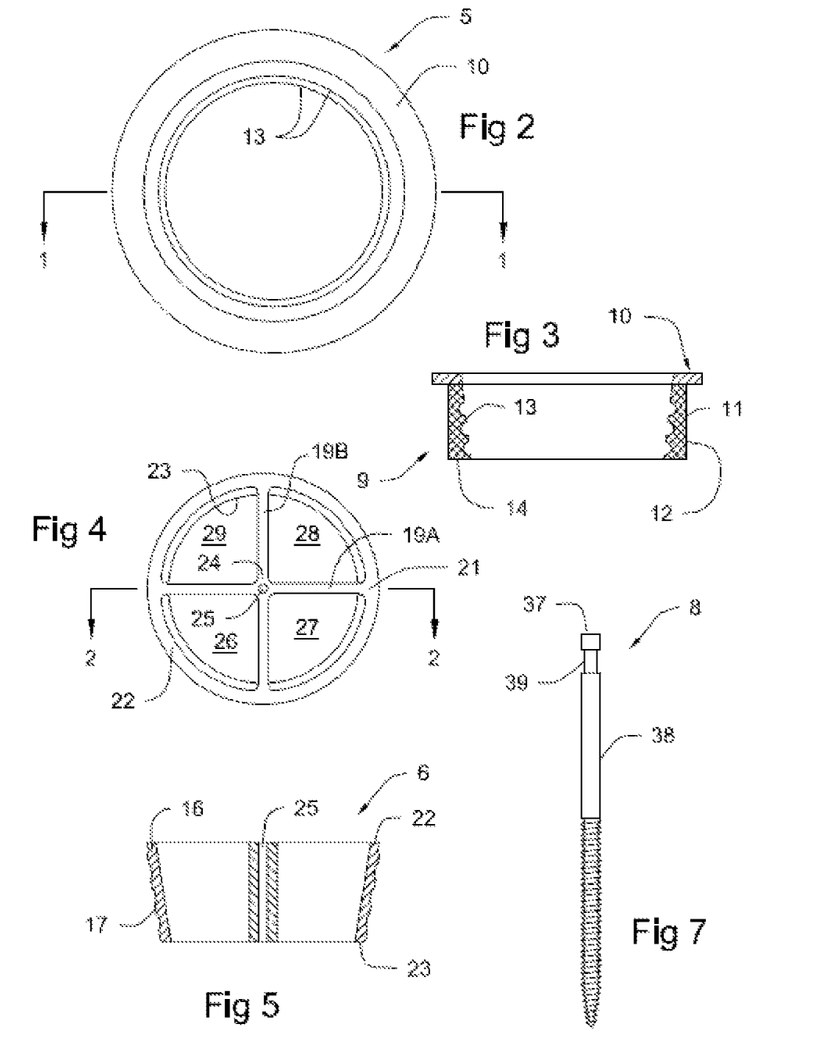
FIG. 2 is a top view of a preferred embodiment of the expandable gasket member.
FIG. 3 is a cross-sectional view taken along lines I-I of the preferred embodiment of the expandable gasket member of FIG. 2.
FIG. 4 is a top view of a preferred embodiment of the rigid support member having perpendicularly oriented spoke members forming channels through the support member to permit liquids and small solid material to flow.
FIG. 5 is a cross-sectional view taken along lines II-II of the preferred embodiment of the rigid support member illustrated in FIG. 4.
FIG. 7 is a side view of one preferred embodiment of the tamper resistant screw that can be used in the floor sink strainer assembly of this invention having a hex head requiring the use of a nut driver for installation and having a groove to accept a locking device to further prevent tampering.

The expandable gasket member 5 is sized and shaped whereby it can be inserted into the discharge tube 4. As seen in FIGS. 2 and 3, the expandable gasket member 5 has a body 9 constructed of an elastic rubber or plastic material or other similar material that can be expanded, but will return to its original shape when the expansion force is removed. Body 9 will be formed by a lip 10 extending horizontally outward from a vertical circular wall 11 having a smooth outer surface 12 and a threaded inner surface 13 that slopes inwardly from lip 10 to the bottom edge 14 of body 9. When body 9 is positioned in discharge tube 4, its outer surface 12 is positioned substantially parallel to and adjacent the discharge pipe inner wall surface 15. The fit between outer surface 12 and inner wall surface 15 should be such that gasket member 5 can be manually pushed in and pulled out of discharge tube 4, but which permits the two surfaces 12 and 15 to sufficiently frictionally engage one another to form a sealing relationship when body 9 is expanded by support structure 6. In a preferred embodiment the sealing relationship will be such that gasket member 5 can not manually be pulled out of discharge tube 4.

The support structure 6 shown in FIGS. 4 and 5 is constructed of a relatively rigid plastic or similar material. Structure 6 includes a wall 16 sized and shaped whereby its threaded outer wall surface 17 will threadingly mate with threaded inner surface 13 in manner that causes gasket body 9 to expand into the desired sealing relationship described above. The threading action will also result in the support structure 6 and the gasket member 5 becoming affixed to one another whereby they can not manually be pulled apart. Support structure wall 16 forms a central passageway 18 that permits liquids and small solid particles to pass through the discharge tube 4. There is at least one support spoke 19 extending between opposite sections 20, 21 of wall 16. In a preferred embodiment spoke 19 extends from the upper edge 22 to the lower edge 23 of wall 16. Spoke 19 has a center section 24 provided with an attachment opening 25. In a preferred embodiment opening 25 extends from the upper edge 22 to the lower edge 23. To better permit support structure 6 to also function as a secondary strainer it is preferred that more than one spoke, such as spokes 19A and 19B, extend across opposite sections of wall 16. This preferred structure decreases the size of the channels 26-29 formed by the multiple spokes 19A and 19B, and thus lessens the change that a solid large object may pass into the discharge tube 4. In a more preferred embodiment there is a common center section 24 and attachment opening 25 for spokes 19A and 19B.

Figure 6:
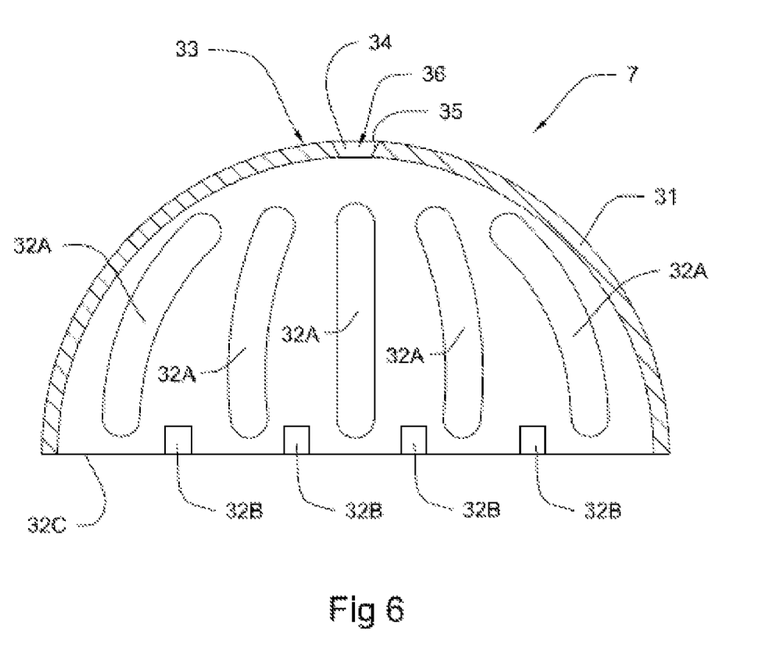
FIG. 6 is a cross-sectional view taken along the mid-section of the preferred embodiment of the dome-shaped strainer member in FIG. 1.

It is preferred that strainer member 7 have a raised shape, and more preferably a dome shape such as shown in FIG. 6, and preferably be constructed of a metal such as aluminum. This raised structure has durability and better permits fluids to flow through the strainer as materials build up in the floor sink well 3. However, strainer member 7 could take other raised shapes, as well as be constructed from a rigid rubber or plastic. In an alternate embodiment a flat strainer or grate 30 could also extend over the well 3 to form a flat continuing surface to minimize the possibility that a person may trip over the well. It is preferred that strainer member 7 be sized to completely fit within well 3. The dome shape wall 31 is provided with a first series of vertical slots 32A that permit liquid and small solids to pass through wall 31. In a more preferred embodiment there is a second series of vertical slots 32B extending upward from the dome wall lower edge 32C. The position and length of slots 32B is set to maintain the structural stability of wall 31. In a preferred embodiment slots 32B will not extend above the lower section of slots 32A and more preferably will be positioned below and between adjacent slots 32A. The top center section 33 of wall 31 is provided with a screw opening 34 preferably formed by a round sloping wall edge 35 that forms a seat 36 for the head of a screw that may be inserted through opening 34.

As illustrated in FIG. 7, the elongated tamper resistant screw 8 has a head 37 shaped to require a special tool for turning the screw 8. One such shape would be a hex head that would require a nut driver for installing and removing the screw 8 from the strainer assembly. In another preferred embodiment the screw shank 38 can be provided with a groove 39 sized and shaped to accept a conventional locking device (not shown). In an alternate embodiment the screw shank 38 could incorporate a locking mechanism, such as a spring loaded latch, requiring a key to de-activate the lock. Other known locking mechanisms could be used.

To install the strainer assembly 1 into an existing floor sink 2 the sink well grate 30 is removed and the flexible gasket member body 9 is inserted into discharge tube 4, preferably whereby lip 10 is seated above the discharge tube 4. The support member 6 is then screwed into gasket member 5 to exert an expansion force against gasket member 5 to cause it to expand into sealing frictional contact with the inner surface 15 of discharge tube 4. In an alternate embodiment, the support member 6 can be partially screwed into gasket member 5 and then gasket member 5 can be inserted into discharge tube 4. This alternate embodiment provides a somewhat more rigid combination that in some instances may be easier to insert into discharge tube 4. Once the two are inserted, then support member 6 is further screwed into gasket member 5 to cause a locking effect between the inner discharge wall 15 and the smooth outer surface 12 of gasket member 5. With the support member 6 thus locked to gasket member 5, and gasket member 5 in turn locked to discharge tube 4, the dome-shaped strainer 7 is positioned over the discharge tube 4 and tamper resistant screw 8 is inserted through dome screw opening 34. The dome-shaped strainer 7 is maneuvered in the floor sink well 3 to align opening 34 with attachment opening 25 so that screw 8 can be screwed using the necessary special tools into attachment opening 25 until the dome-shaped strainer 7 is tightened against the bottom wall 40 of floor sink well 3.

In the event that it is desired to remove the strainer 7, screw 8 can be removed again by using the necessary special tools (and key if a locking device is also utilized). Because special tools are required, it is less likely that unauthorized persons would remove strainer 7. Even if that should occur, the construction of the support structure 6 acts as a secondary strainer, and this would also require its removal before any large solid object would be able to pass into the discharge pipe and create a blockage. If it is desired for the entire strainer assembly 1 to be removed, then with the dome-shaped strainer 7 removed one next unscrews the support structure 6 from the gasket member 5 at least sufficiently to remove the expansion force on the gasket member 5 and then pulls the support structure 6 and gasket member 5 from the discharge tube 4. Alternatively, one can completely unscrew the support structure 6 from the gasket member 5 before pulling the gasket member 6 from the discharge tube 4.

It has been found that if additional obstacles are placed on removing the strainers protecting the building drain system from blockage the less likely some unauthorized person will remove such strainers. Thus, this invention not only provides a strainer assembly 1 that is easy to install, but is difficult to remove without the correct tools. However, with the correct tools the strainer assembly 1 can be quickly and easily disassembled in part, or completely, for removal from the discharge tube 4 or as illustrated in FIG. 1B from the drain pipe 4A.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

We claim:

1. A tamper resistant strainer assembly for use in floor drains or indirect waste receptors having a well formed by a side wall and a floor plate and provided with a discharge tube extending downward from the floor plate and attachable to a drain pipe of a building drain system wherein the discharge tube having an interior wall surface forming a discharge passageway through which material collected in the well can pass, comprising:

a. an expandable gasket member having a body section formed by a wall and sized to fit into the discharge tube or the drain pipe, the wall of the body section having an interior wall surface forming a passageway, the interior wall surface having a threaded section;

b. a rigid support structure having a side wall provided with exterior threads sized to operative mate with the threaded section of the gasket member interior side wall, the rigid support structure constructed having sufficient rigidity and sized to expand the expandable gasket member into sealing contact against the inside wall surface of the floor sink discharge tube or drain pipe; the rigid support member having at least one support spoke extending between the interior side walls of the rigid support member, the at least one support spoke having a center section provided with a vertically oriented opening;

c. a strainer member having a top surface section provided with a screw opening, and d. an elongated screw having a tamper resistant head at a first end of the elongated screw and sized to seat in the screw opening; the elongated screw having a threaded section at an opposite end of the elongated screw, the elongated screw being of sufficient length to extend through the screw opening and operatively engage the vertically oriented opening to affix the strainer member to the support member.

2. A tamper resistant strainer assembly according to claim 1 further comprising a locking device attachable to the screw at the first end.

3. A tamper resistant strainer assembly according to claim 1 wherein said gasket is constructed of flexible rubber or plastic.

4. A tamper resistant strainer assembly according to claim 1 wherein the support member has at least two support spokes, each extending between the interior side walls of the rigid support member and positioned perpendicular to one another, the at least two support spokes forming a center section provided with the vertically oriented opening.

5. A tamper resistant strainer assembly according to claim 4 wherein the at least two support spokes extend from an upper edge of the support structure to a bottom edge of the support structure to form a series of passageway channels extending through the support structure.

6. A tamper resistant strainer assembly according to claim 1 wherein the strainer member is constructed having one or more raised walls provided with vertically oriented slots.

7. A tamper resistant strainer assembly according to claim 6 wherein the one or more raised walls is dome-shaped.

8. A tamper resistant strainer assembly according to claim 7 wherein the one or more raised walls is provided with a first series of vertically oriented slots and a second series of vertically oriented notches extending from a bottom edge of the dome-shaped wall upward to a position below the first series of vertically oriented slots.

9. A tamper resistant strainer assembly according to claim 8 wherein the notches are positioned to extend upward in a direction between adjacent vertically oriented slots.

10. A tamper resistant strainer assembly according to claim 1 wherein the strainer member is a floor level strainer having a top surface section provided with a screw opening, and wherein the elongated screw having a tamper resistant head at a first end of the elongated screw and sized to seat in the screw opening; the elongated screw having a threaded section at an opposite end of the elongated screw, the elongated screw being of sufficient length to extend through the screw opening and operatively engage the vertically oriented opening to fix the strainer member to the support structure.

11. A tamper resistant strainer assembly according to claim 1 wherein the expandable gasket member further comprises an upper lip member extending outward from a top portion of the body section a sufficient distance to extend past the discharge tube or drain pipe.

12. A tamper resistant strainer assembly according to claim 1 wherein the elongated screw is constructed having a keyed lock.

\* \* \* \* \*